INVENTORS.
FRANK KESSLER
WINFRED T. POWELL
BY Winfred T. Powell
ATTORNEY

Dec. 30, 1952 F. KESSLER ET AL 2,623,956

TELEPHONE TEST SELECTOR

Filed Feb. 14, 1949 3 Sheets-Sheet 2

INVENTORS.
FRANK KESSLER
WINFRED T. POWELL
BY Winfred T. Powell
ATTORNEY

TELEPHONE TEST SELECTOR

Filed Feb. 14, 1949 3 Sheets-Sheet 3

INVENTORS.
FRANK KESSLER
WINFRED T. POWELL
BY Winfred T. Powell
ATTORNEY

Patented Dec. 30, 1952 2,623,956

UNITED STATES PATENT OFFICE 2,623,956

TELEPHONE TEST SELECTOR

Frank Kessler and Winfred T. Powell, Rochester, N. Y., assignors to Stromberg-Carlson Company, a corporation of New York Application February 14, 1949, Serial No. 76,366

32 Claims. (Cl. 179—175.2)

Figure 1:
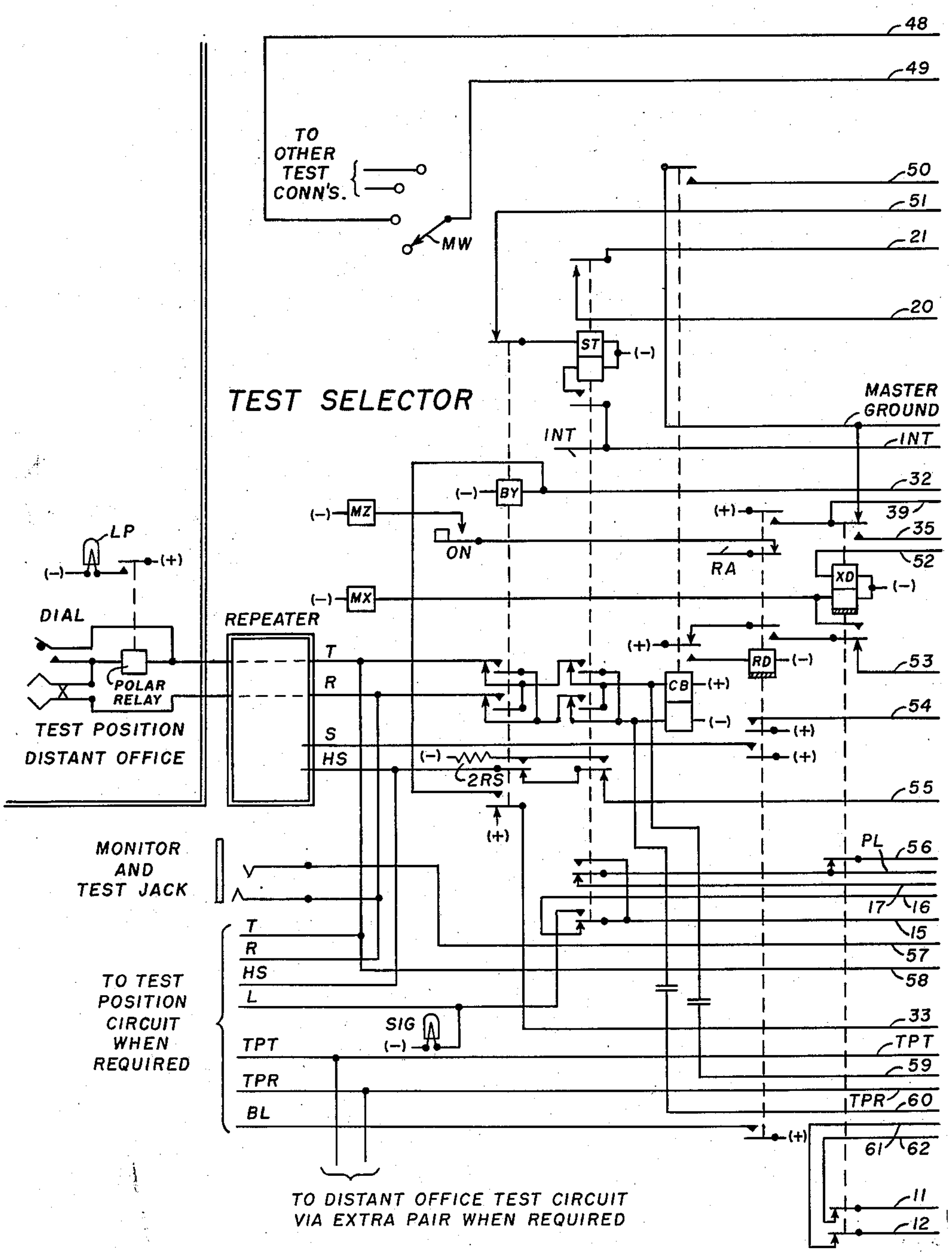

The present invention relates to telephone systems and it more particularly pertains to an improved test selector for enabling the test operator or wire chief to effect the busy verification or the testing of lines in such systems.

As an example of where the improved test selector of the present invention may be used, a community dial office may be considered, which is an unattended dial office having therein a test selector and one or more connector groups, each having therein a test connector.

In the case of a connection to a line in the community dial office for testing purposes, the test selector responds to one digit for selecting the test connector in the desired hundreds group. The test selector next repeats the tens and units digits to the selected test connector for advancing this connector to the terminals of the called line. The station digit is next dialed, which digit is not repeated to the selected test connector, since the circuits are so arranged that the test connector may be advanced in its secondary movement, one step at a time, by dialing the digit 1 after the station digit is dialed.

One feature of the present invention is the provision of verification and automatic testing services in a remotely controlled community dial office.

Another feature is an arrangement whereby a connection to a busy line returns reverse battery supervision to the verification operator and permits listening in on the called line through a condenser bridge.

Still another feature of the present invention is an arrangement whereby answering supervision is returned to the incoming trunk circuit over a fourth wire conductor.

A further feature of the present invention is the provision of means whereby the test selector will perform its function only when selected from an incoming trunk and not if selected by a local subscriber.

An additional feature of the present invention is the circuit arrangement of the test selector whereby the verification and testing facilities are available to the calling operator regardless of the number of preceding tandem offices.

Still another feature of the present invention is a monitor jack on the test selector for permitting a local attendant in the community dial office to control the selector in the same manner as when controlled from an operator's position.

An important and specific feature of the present invention is the operation of the test selector whereby the first digit dialed selects the desired test connector, the second and third digits set the test connector on the desired line and the fourth digit is cancelled as far as the test connector is concerned, so that the test connector will remain on the called line. This cancelling of the fourth digit permits the operator to dial the complete called number without the necessity of remembering to omit the last digit, while permitting the dialing of certain additional digits, after the station digit is dialed, without affecting the selected test connector.

Another important and specific feature of the present invention is the operation of the test selector whereby, in response to the dialing of the station digit, the called line, if idle, is automatically tested for a battery fault on either side of the line, a ground fault on either side of the line or a short circuit on the called line. During this automatic testing operation, flashing signals are returned to the calling test operator indicating whether or not the called line has a faulty condition thereon and, by means of the number of flashes returned, the type of fault on the called line. After this automatic test of the called line, the circuits of the test selector await the next dialing operation, which may control a repetition of the automatic test of this same called line, the stepping of the test connector one step in its secondary direction (after which the automatic tests are again made of the called line), the placing of the circuits in condition for a manual test of the called line, or the release of the test selector.

Still another feature of the present invention is the provision of circuit means to enable the operator to step the test connector across the selected level, one step at a time, by dialing the digit 1 for each desired step. After this digit 1 is dialed, the test selector performs the above mentioned automatic tests.

Another and important feature of the present invention is the circuit arrangement of the test selector whereby the digit 2 may be dialed (and repeated as often as desired) for repeating the above mentioned automatic tests of the called line for a battery fault, for a ground fault and for a loop fault and for transmitting back to the operator a flashing signal, the number of flashes indicating the type of fault or the non-faulty condition found on the called line.

Another feature of the present invention is a circuit arrangement whereby the test operator can dial the digit 3 after the called line has been selected, for connecting the called line conductors back over an independent test circuit leading to the test position. Normally, the control line circuit leading to the test position is connected to the called line through talking condensers so that the test operator can listen for a noisy line condition. Then by dialing the digit 3, as above described, manual tests can be made on the called line.

Still another important feature of the present invention is the circuit arrangement of the test selector whereby the digit 4 may be dialed for effecting the release of the selected test connector without releasing the test selector.

A feature of the present invention is the circuit arrangement of the test selector whereby, during the automatic testing of a called line, a sensitive relay is locally energized and operated, then connected to the line, with the local energizing circuit disconnected to determine if there is a fault on this line of the type being tested for and of a value sufficient to hold the relay operated. If there is such a fault the testing operation is stopped at this point, the operator is advised of the type of fault by a flashing signal and the testing operation may then be repeated if desired.

Still a further feature of the present invention is the circuit arrangement whereby the bank terminals of the test selector are connected in multiple to the wipers of the test connectors in all hundreds groups. This is possible because only one call can be set up to one test connector at any one time.

The foregoing and other features will be described hereinafter with reference to the accompanying drawings, which show diagrammatically a sufficient amount of the equipment and circuits involved to enable one skilled in the art to understand the invention.

Figure 2:
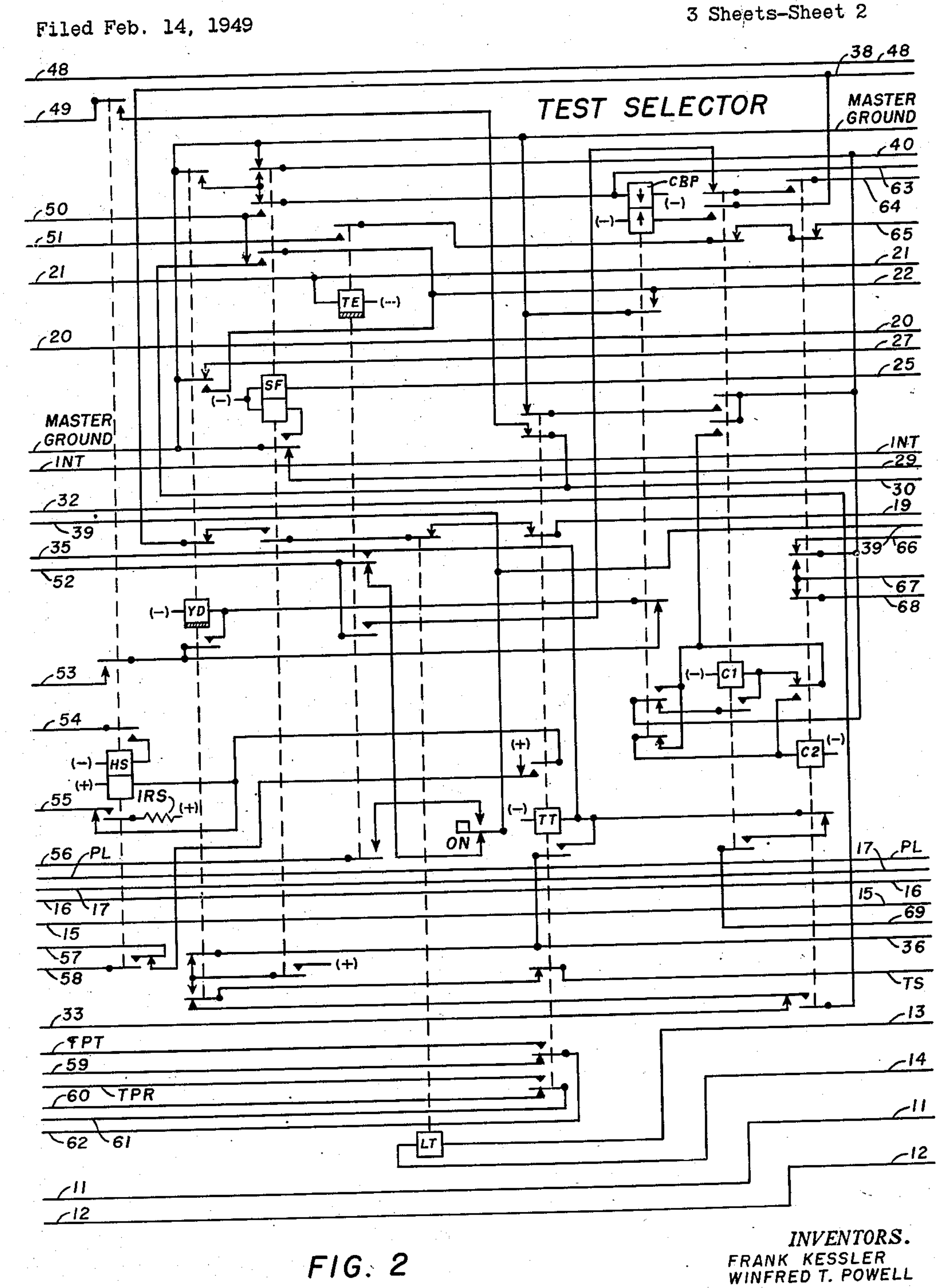
Figure 3:
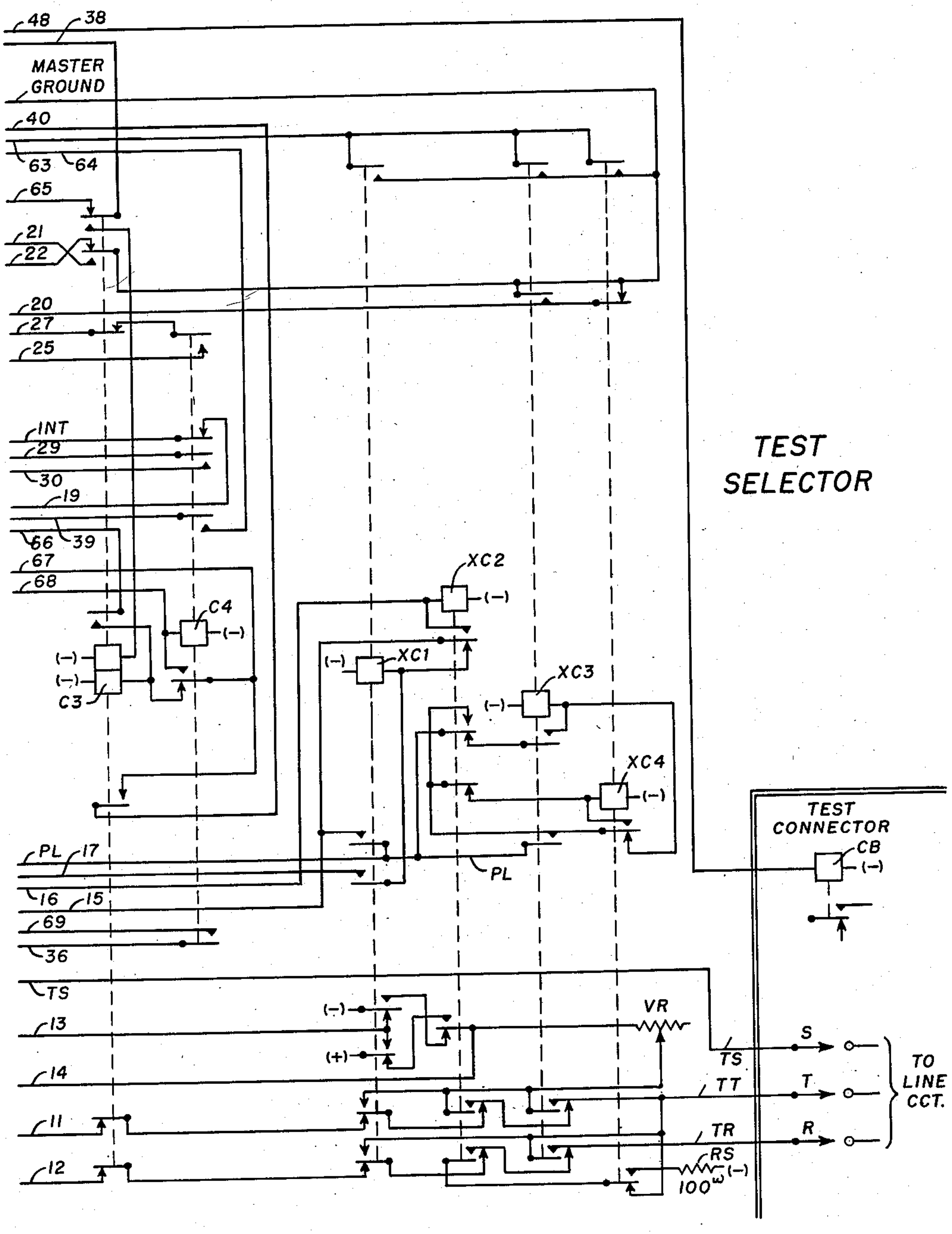

Referring to the drawings, Fig. 1, 2 and 3, when placed in the order named and with correspondingly identified lines in alignment, show the test selector and a sufficient amount of the other co-operating circuits for an understanding of the invention. A detailed description of the circuit operations will now be given.

*Test selector seized*

When the test selector is seized, either by a preceding selector or by a switching through connector, the closed circuit across the calling line (T and R conductors incoming to the test selector from the repeater) operates relay CB over a circuit which may be traced from (+), upper winding of relay CB, break contact of relay ST, break contact of relay BY, tip conductor T, over the preceding switching circuits and the calling line in series, ring conductor R, break contacts of relays BY and ST and lower winding of relay CB to (−). Relay CB closes an obvious circuit for operating slow acting relay RD. Relay RD connects (+) to conductor BL for lighting a busy lamp, applies (+) potential to the master ground conductor by way of a break contact of relay XD, and also connects (+) to conductor S for holding and busy purposes. The operation of relay RD also closes a circuit for operating relay XD which may be traced from (+), make contact of relay RD, conductor 39, break contact of the off-normal combination ON (this off-normal combination being controlled by the minor switch of the test selector), break contact of relay TE, conductor 52, and upper winding of relay XD to (−). The operation of relay XD closes a circuit for operating relay TT extending from (+), make contacts of relays RD and XD, conductor 35, and winding of relay TT to (−).

If this is a call from a test or verification position, (−) potential (not shown) will be applied to discriminating conductor HS during dialing for operating discriminating relay HS over a circuit extending from (+), lower winding of relay HS, break contacts of relays HS, ST and BY and conductor HS to (−). The operation of relay HS closes a locking circuit for itself extending from (+), make contact of relay RD, conductor 54, make contact and upper winding of relay HS to (−). The operation of relay HS substitutes resistor 1RS for the lower winding of relay HS in the connection to conductor HS.

*Dialing hundreds digit*

The foregoing operations place the selector circuit in condition to receive the hundreds digit for selecting the test connector in the desired hundreds group. In this example it will be assumed that the digit 1 is dialed for the hundreds digit, resulting in the transmission of one impulse. The release of relay CB at the beginning of this impulse closes a circuit for operating the minor switch stepping magnet extending from (+), break contact of relay CB, make contact of relay RD, make contact of relay XD and winding of magnet MX to (−). This operation of magnet MX causes the minor switch to take one step away from normal for switching the off normal contacts and for selecting the test connector in the first hundreds group. The beginning of this impulse and the consequent release of relay CB, as well as the release of relay CB at the beginning of other impulses (if more than one impulse is transmitted) closes a holding circuit for relay XD, this circuit including the lower winding of relay XD connected in multiple with magnet MX. When relay CB remains in its operated position at the end of the impulse transmission for the hundreds digit, relay XD is released because its circuit is opened and held open by the continued operation of relay CB, which also opens the circuit of the MX magnet for leaving the minor switch in the selected position. It will be noted that the operation of relay XD disconnects (+) from the master ground conductor. This is of no effect at this time because no circuit is yet controlled over this conductor. The release of relay XD opens up and releases TT. The wiper MW of the minor switch connects to the control conductor leading to the CB relay of the test connector, consequently when relay TT releases, the CB or control relay of the test connector is energized over a circuit which may be traced from (+) on the master ground conductor, make contact of relay CB, conductor 50, break contact of relay SF, break contact of relay TT, make contact of relay HS, conductor 49 and wiper of the minor switch to the control conductor leading to the selected connector. This energizes the control relays of the selected connector in preparation for its operation in response to the tens and units digits dialed.

*Dialing tens digit*

It will be assumed that the tens digit is one thus effecting the single release of relay CB in response to the transmission of this digit. The release of relay CB opens up the above described circuit leading to the control relay of the test connector for causing this connector to take one step in its primary or tens direction, after which the continued operation of relay CB keeps the control conductor closed for effecting the change over operation at the test connector in preparation for the units digit. The release of relay CB at the beginning of the tens digit transmission closes a circuit for operating relay YD which may be traced from (+), break contact of relay CB, make contact of relay RD, break contact of relay XD, conductor 53, make contact of relay HS, break contact of relay CBP, and winding of relay YD to (−). The operation of relay YD closes a locking circuit for itself extending from (+), break contact of relay CB, make contact of relay RD, break contact of relay XD, conductor 53, make contact of relay HS, make contact and winding of relay YD to (−), this locking circuit maintaining relay YD energized during the transmission of the impulses after relay CBP is operated. Relay CBP is operated in response to the operation of relay YD over a circuit extending from (+) on the master ground conductor, make contact of relay YD, break contact of relay SF, and upper winding of relay CBP to (−). Relays YD and CBP remain energized during the transmission of the tens impulses and are released in sequence at the end of the tens impulse transmission because relay CB remains operated long enough for relay YD to lose its slow acting characteristics, release and release relay CBP.

The operation of relay CBP closes a circuit for operating counting relay C1 extending from (+) on the master ground conductor, break contact of relay SF, conductor 40, make contact of relay CBP, break contact of relay C2 and winding of relay C1 to (−). When relay CBP releases to mark the end of the tens digit, a locking circuit is closed for relay C1 extending from (+) on conductor 40, break contact of relay CBP, make contact and winding of relay C1 to (−). This release of relay CBP closes an operating circuit for counting relay C2 extending from (+) on conductor 40, make contact of relay C1, break contact of relay CBP and winding of relay C2 to (−). Relay C2 closes a first locking circuit for itself extending from (+) on conductor 40, make contact of relay C1, make contact and winding of relay C2 to (−). The operation of relay C2 closes a circuit for operating counting relay C3 extending from (+) on conductor 40, make contact of relay C2, conductor 67, break contact of relay C4 and lower winding of relay C3 to (−). The operation of relay C3 closes a circuit for operating relay TE extending from master ground, make contact of relay C3, conductor 21 and winding of relay TE to (−).

*Dialing units digit*

The circuits are now in condition for receiving the units digit transmission. The release of relay CB at the beginning of the units digit again opens up the above described circuit to the CB relay of the test connector for causing this connector to respond to the units digit. The release of relay CB closes the operating circuit for relay YD, this relay locks itself operated and operates relay CBP in the previously described manner. The operation of relay CBP opens up the above described locking circuit for relay C1 for effecting the release of this relay. The release of relay C1 opens up the above described first locking circuit for relay C2, but before this happens a second locking circuit is closed for relay C2 by the operation of relay CBP, this locking circuit extending from (+) on conductor 40, make contact of relay CBP, make contact and winding of relay C2 to (−). This holds relay C2 in its operated position. When relay CB remains in its operated position at the end of the units digit transmission, relays YD and CBP are released as before. The release of relay CBP opens up the above described second locking circuit for relay C2 for releasing this relay. The release of relay C2 for releasing this relay. The release of relay C2 closes a locking circuit for relay C3 extending from (+) on conductor 40, break contact of relay C2, conductor 66, make contact and lower winding of relay C3 to (−). The release of relay C2 also closes a circuit for operating relay C4 extending from (+) on conductor 40, make contact of relay C3, conductor 67, break contact of relay C2 conductor 68 and winding of relay C4 to (−). Relay C4 closes a locking circuit for itself extending from (+) on conductor 40, make contact of relay C3, make contact and winding of relay C4 to (−). The units digit transmission effects the selection of the called line at the test connector.

*Dialing station digit*

The station digit is now dialed and when relay CB is released at the beginning of this digit, relays YD and CBP are operated and relay YD is locked as before. The operation of relay CBP closes the above described circuit for again operating relay C1. When relay CB remains operated at the end of this digit transmission, relays YD and CBP are released as before. The release of relay CBP closes the above described locking circuit for relay C1 and the above described operating circuit for relay C2, as well as the above described first locking circuit for relay C2. The operation of relay C2 opens up the above described locking circuit for relay C3 for effecting the release of this relay.

The station digit transmission is not effective to interrupt the control circuit leading to the test connector because the circuit to the test connector by way of wiper MW of the test selector is maintained energized when relay C4 is operated before the station digit transmission. This circuit may be traced from (+) on the master ground conductor, break contact of relay SF, conductor 29, make contact of relay C4, conductor 30, break contact of relay TT, make contact of relay HS, conductor 49 and wiper MW.

*Called line busy*

It will first be assumed that the called line is busy. Regardless of the condition of the called line (busy or idle), relay SF is operated after the counting relay group, including relays C1—C4, records the dialing of the station digit. The circuit for operating relay SF may be traced from (+) on the master ground conductor, break contact of relay YD, conductor 27, break contact of relay C3, make contact of relay C4, conductor 25 and upper winding of relay SF to (−). Relay SF closes a locking circuit for itself extending from (+) on the master ground conductor, make contact and lower winding of relay SF to (−). The operation of relay SF disconnects master ground conductor from conductor 40 for effecting the release of counting relays C1, C2 and C4. The release of relay C3 opens up and releases relay TE. The operation of relay SF switches the operating circuit of relay CBP from the control by relay YD to a control circuit including a contact of relay CB, since relay CBP is later to be controlled by the impulses transmitted by relay CB instead of the groups of impulses as marked by the operation of relay YD. The circuit for operating relay CBP may now be traced from (+) on the master ground conductor, make contact of relay CB, conductor 50, make contact of relay SF, and upper winding of relay CBP to (—).

Relay BY is operated (called line is busy) over a circuit extending from (+) on the sleeve of the called line (not shown) sleeve wiper S of the test connector, conductor TS, break contact of relay TT, break contact of relay YD, make contact of relay C2, conductor 32 and winding of relay BY to (—). When relay C2 is released following the operation of relay SF, relay BY is not released because of a locking circuit for this relay which may be traced from (+) on the sleeve conductor of the called line and over the above described circuit, break contact of relay C2, conductor 33, make contact and winding of relay BY to (—). It will be pointed out at this time that a call to an idle line does not effect the operation of relay BY and when relay C2 is released, (+) is applied to the sleeve conductor of the called line for operating the cut off relay of this line and for making the line busy over a circuit which may be traced from (+), break contact of relay BY, conductor 33, break contact of relay C2, break contact of relay YD, break contact of relay TT, conductor TS and over the sleeve conductor of the called line to the cut off relay at this line circuit.

*Called line idle*

In the event that the called line is idle when relay SF is operated, the automatic testing operations will be effected as will be later described. This is because relay BY is not operated. In connection with a call to a busy line the automatic testing operations are not effected because the upper winding of relay ST (which controls these testing operations) is open at the upper break contact of relay BY. On a call to an idle line the distant test operator can listen in on the called line since the tip and ring line conductors are extended back by way of wipers T and R of the test connector, conductors TT and TR, break contacts in series of relays XC3, XC2 and XC1, break contacts of relays C3, XD and TT, including conductors 11 and 12 and the talking condensers to the calling line. In connection with a call to a busy line from a toll operator's position, in connection with toll offering or verification, the operation of relay BY indicates this condition by reversing the battery. A talking circuit is completed to the called line by way of the talking condensers.

Recalling that relay C4 is released by the operation of relay SF, a circuit is closed for maintaining the control conductor leading to the selected test connector energized, this circuit being established by the operation of relay SF before the release of relay C4 and may be traced from (+) on the master ground conductor, break contact of relay C3, conductor 22, make contact of relay SF, break contact of relay TT, make contact of relay HS, conductor 49 and wiper MW of the minor switch. This maintains the control circuit to the test connector energized during the next interruption of the line circuit and the consequent release of relay CB, since the interruptions in the line circuit at this time do not step the test connector but determines whether the control circuit to the test connector is to be opened for stepping this connector in its secondary direction or whether the interruptions control the re-start of the testing operations or the release of the test connector, etc. in a manner that will be later described.

*Dialing 1 to step the test connector*

Assuming that the test operator desires to advance the test connector one step in its secondary direction, the digit 1 is dialed for effecting the release of relay CB, followed by its continued energization. It might be pointed out at this time, that the operation of relay BY reverses the battery back over the T and R conductors for lighting a lamp at the test position by means of any of the well known circuits for this purpose, such as the use of the polar relay indicated at the test position for closing an obvious circuit for lamp LP. Furthermore, the operation of relay BY switches conductor HS from (+) through resistor 1RS to (—) through resistor 2RS to provide supervision back to the originating end, if this supervision is controlled over a fourth conductor instead of over the line conductors.

The release of relay CB, in response to the dialing of the digit 1 opens up and releases relay CBP. The release of relay CBP closes a circuit for operating relay YD which may be traced from (+), break contact of relay CB, make contact of relay RD, break contact of relay XD, conductor 53, make contact of relay HS, break contact of relay CBP, and winding of relay YD to (—). Since relay YD must be maintained operated in the event that more than one impulse is transmitted for this digit, a locking circuit is provided for relay YD which may be traced from (+), break contact of relay CB, make contact of relay RD, break contact of relay XD, conductor 53, make contact of relay HS, make contact and winding of relay YD to (—). This locking circuit is established before relay CBP is next operated for opening up the above described operating circuit for relay YD. When relay CB is energized the above described operating circuit for relay CBP is again established and since relay CB remains energized at this time, relay YD is released.

The operation of relay YD, at the beginning of this digit, opens up the above described locking circuit for relay BY for effecting the release of this relay. The operation of relay CBP, following its release in response to the transmitted impulse, closes a circuit for operating relay C1 which may be traced from (+) on the master ground conductor, make contact of relay YD, make contact of relay SF, conductor 40, make contact of relay CBP, break contact of relay C2 and winding of relay C1 to (—). Relay C1 closes a locking circuit for itself extending from (+) on the master ground conductor, break contact of relay TT, make contacts in series of relay C1, break contact of relay C2 and winding of relay C1 to (—). When common interrupter conductor INT is energized, following the release of relay YD, relay CBP is released by means of a circuit extending from conductor INT, break contact of relay C4, conductor 19, break contact of relay TT, break contact of relay LT, make contact of relay SF, break contact of relay YD, conductor 38, make contact of relay C1 and lower winding of relay CBP to (—). Since the upper winding of relay CBP is energized at this time from (+) on the master ground conductor by way of the uppermost make contact of relay CB, both windings of relay CBP are now energized in opposition for causing the release of this relay. The release of relay CBP closes a circuit for operating relay C2 extending from (+) on the master ground conductor, break contact of relay TT, make contacts in series of relay C1, break contact of relay CBP and winding of relay C2 to (−). This release of relay CBP also closes a second locking circuit for relay C1 before relay C2 is operated to open up the above described first locking circuit for relay C1. This second locking circuit for relay C1 may be traced from (+) on the master ground conductor, break contact of relay TT, make contact of relay C1, conductor 40, break contact of relay CBP, make contact and winding of relay C1 to (−). The operation of relay C2 closes a locking circuit for itself extending from (+) on the master ground conductor, break contact of relay TT, make contacts in series of relay C1, make contact and winding of relay C2 to (−).

The operation of relay C2 closes a circuit for operating relay C3 extending from (+) on the master ground conductor, break contact of relay TT, make contact of relay C1, conductor 40, make contact of relay C2, conductor 67, break contact of relay C4 and lower winding of relay C3 to (−). When conductor INT is de-energized to mark the end of the pulse which released relay CBP, this relay is again operated because at this time only its upper winding is energized. This operation of relay CBP opens up the above described locking circuit for relay C1 for effecting the release of this relay. The release of relay C1 opens up the above described locking circuit for relay C2 and the above described operating circuit for relay C3 for effecting the release of these two relays. While relay C3 is operated a circuit is again closed for operating relay TE extending from (+) on the master ground conductor, make contact of relay C3, conductor 21, and winding of relay TE to (−). The previously described operation of relay TE was of no consequence. The function of this operation of relay TE will be later explained.

It will now be explained how the control conductor to which wiper MW is connected is momentarily interrupted for supplying a single pulse to the CB relay of the test connector for causing it to take one step in its secondary direction. It will be understood that this single pulse must not be transmitted until relay YD releases to mark the end of the impulse transmission by relay CB. At this time it is determined that a single pulse is to be transmitted to the test connector because a single pulse was received, leaving relay C3 operated, relay YD released and relay CBP operated. Tracing the control conductor from the test connector by way of wiper MW through a make contact of relay HS, a break contact of relay TT, this circuit extends by way of conductor 30 to an open contact at relay C4 and by way of a make contact of relay SF and conductor 22 to a make contact of relay CBP and a break contact of relay C3 in multiple to master ground. Consequently, with relay YD released the master ground conductor is disconnected from conductor 22 at this point and with relay CBP released and relay C3 operated, the master ground conductor is disconnected from conductor 22 at these two points. This opens up the circuit to the control conductor and when relay CBP is again operated (as previously described) conductor 22 is again connected to (+) on the master ground conductor, and when relay C3 is released (as above described) the master ground conductor is connected to conductor 22 at this point, thus energizing the control conductor after the impulse is applied to this conductor.

*Automatic test of called line*

The next line in the level has now been selected and it will be assumed that this line is idle so that the automatic testing operations can be effected. The sleeve conductor TS is now connected to ground by way of break contacts of relays TT, YD, C2 and BY. With relay TE operated and with all of the counting relays C1—C4 of the first group released, as above described, a circuit is now closed for operating stepping relay ST extending from the common interrupter, break contact of relay C4, conductor 19, break contact of relay TT, break contact of relay LT, make contact of relay SF, break contact of relay YD, conductor 38, break contacts in series of relays C3—C1, make contact of relay TE, conductor 51, break contact of relay BY and upper winding of relay ST to (−). The operation of relay ST closes a locking circuit for itself extending from the common interrupter conductor INT, make contact and lower winding of relay ST to (−). This locking circuit is for the purpose of maintaining relay ST operated, when once operated, even though its operating circuit, above described, is opened which will be the case when relay TE releases at the end of the stepping cycle. In this example it will be assumed that there is no trouble condition on the called line, consequently the second group of counting relays XC1—XC4 will complete an operating cycle and four flash pulses will be transmitted back to the operator as an indication that the called line is free of trouble. It will be noted that, should relay C3 be conditioned to release as above described during an impulse period on conductor INT, it will not release because of a locking circuit from conductor INT (on conductor 38), make contact and upper winding of relay C3 to (−). This prevents the application of a short pulse from INT to relay ST and the consequent false flash of the distant office signal.

The operation of relay ST closes a circuit for operating relay XC1 extending from (+), make contact of relay RD, conductor 39, off normal contact ON, make contact of relay TE, conductor 56, break contact of relay XD, make contact of relay ST, conductor 15, break contact of relay XC2 and winding of relay XC1 to (−). When relay ST releases at the end of the impulse on conductor INT, a locking circuit is closed for relay XC1 extending from (+), make contact of relay RD, conductor 39, off normal contact ON, make contact of relay TE, conductor 56, break contact of relay XD, break contact of relay ST, conductor 17, make contact and winding of relay XC1 to (−). The release of relay ST also closes a circuit for operating relay XC2 extending from (+), make contact of relay RD, conductor 39, off normal contact ON, make contact of relay TE, conductor 56, break contact of relay XD, conductor PL, make contact of relay XC1, conductor 15, break contact of relay ST, conductor 16 and winding of relay XC2 to (−). Relay XC2 closes a first locking circuit for itself extending over the above described circuit including conductor 15, make contact and winding of relay XC2 to (−). The operation of relay XC2 closes a circuit for operating relay XC3 extending from (+) on conductor PL (above described), make contact of relay XC2, break contact of relay XC4 and winding of relay XC3 to (−).

When relay ST again operates to mark the beginning of the second impulse on conductor INT, the above described locking circuit for relay XC1 is opened for effecting the release of this relay. Before relay XC1 releases, a second locking circuit is closed for relay XC2 extending from (+) on conductor PL (above traced), make contact of relay ST, conductor 15, make contact and winding of relay XC2 to (−). This holds relay XC2 in its operated position to prevent its release when the above described first locking circuit for this relay is opened by the release of relay XC1.

When relay ST releases to mark the end of the second impulse on conductor INT, the second locking circuit for relay XC2 is opened for effecting the release of this relay. The release of relay XC2 closes a locking circuit for relay XC3 extending from (+) on conductor PL, break contact of relay XC2, make contact and winding of relay XC3 to (−). The release of relay XC2 closes an operating circuit for relay XC4 extending from (+) on conductor PL, make contact of relay XC3, break contact of relay XC2 and winding of relay XC4 to (−). The operation of relay XC4 closes a first locking circuit for itself extending from (+) on conductor PL, make contact of relay XC3, make contact and winding of relay XC4 to (−).

When relay ST operates to mark the beginning of the third impulse, relay XC1 is again operated over the above described circuit for this relay and when relay ST releases to mark the end of the third impulse, relay XC1 is locked operated, relay XC2 is again operated and locked as above described. This operation of relay XC2 opens up the above described locking circuit for relay XC3 for effecting the release of this relay. This operation of relay XC2 also closes a second locking circuit for relay XC4 extending from (+) on conductor PL, make contact of relay XC2, make contact and winding of relay XC4 to (−). This second locking circuit holds relay XC4 operated when the above described first locking circuit for this relay is opened by the release of relay XC3.

When relay ST operates to mark the beginning of the fourth impulse, relay XC1 is released and relay XC2 is locked in the previously described manner. Relay ST is now released to mark the end of the fourth impulse, but before this happens the XC relays left operated (XC2 and XC4) will be released by the release of relay TE. It will now be explained how relay TE is maintained operated during a testing operation. Each operation of relay ST closes an energizing circuit for relay TE extending from (+) on the master ground conductor, break contact of relay XC4, or make contact of relay XC3, conductor 20, make contact of relay ST, conductor 21, and winding of relay TE to (−). This means that relay TE will be energized at each energization of relay ST as long as relay XC3 is operated or as long as relay XC4 is not operated. Since these pulses applied to conductor INT are at a rate approximately 1 per second, relay TE is not released during the time that relay ST is de-energized, because of the slow acting characteristics of the TE relay. Now when relay XC3 is released, with relay XC4 operated, there is no energizing circuit for relay TE even with relay ST operated. This means that shortly after relay ST is energized to mark the beginning of the fourth impulse, relay TE will release. The release of relay TE disconnects (+) from conductor PL for effecting the release of relays XC2 and XC4.

The circuits are now in condition for the distant test operator to again listen in on the called line. The circuit from the called line may be traced from the T and R wipers of the test connector, break contacts in series of relays XC3, XC2, XC1, C3, XD, TT and condensers to the incoming talking circuit. It will be noted that the called line circuit is disconnected from the talking circuit, including the talking condensers, while the automatic testing operation is being effected because one or more of the relays XC1, XC2 is in its operated position during this test.

It will now be explained how the automatic testing of the called line is effected as the second group of counting relays, including relays XC1—XC4, runs through its cycle. Referring back to the beginning of the stepping operation of the second counting relay group, the operation of relay XC1 (in response to the operation of relay ST) closes a priming circuit for relay LT for energizing this relay locally. This circuit may be traced from (+), make contact of relay XC1, conductor 13, winding of relay LT, conductor 14, break contact of relay XC2 and make contact of relay XC1 to (−). Now when relay XC2 is operated (in response to the release of relay ST), the above described priming circuit for relay LT is opened by disconnecting (−) from conductor 14 at the break contact of relay XC2. This leaves relay LT connected to the line conductors for testing this line for a battery fault. This testing circuit may be traced from (+), make contact of relay XC1, conductor 13, winding of relay LT, conductor 14, variable resistor VR, make contact of relay XC1 (before relay XC2 operates) or make contact of relay XC2 (after relay XC2 operates), break contact of relay XC3, common conductor TT, wiper T of the test connector used, over the tip and ring sides of the called line, wiper R, common conductor TR, break contact of relay XC3, make contact of relay XC2 (or make contact of relay XC1 before relay XC2 operates) and break contact of relay XC4 to conductor TT. This applies (+) potential to both conductors of the called line, in series with relay LT and resistor VR, to determine if there is a (−) potential on the called line. Assuming that there is no battery or (−) fault on the line, relay LT will be released for completing the previously described circuit from the common interrupter to the upper winding of relay ST for operating this relay to continue the stepping operation. If there is a battery fault on the called line, relay LT will not release, relay ST will not be again energized and relay TE will be released for stopping the stepping operations of the second counting relay group by disconnecting (+) from pulse conductor PL at the lowermost make contact of relay TE. This will place the circuits in condition awaiting release or dialing of the next digit.

Assuming that no battery fault is found on the called line, the next operation of relay ST releases relay XC1 and locks relay XC2, as previously described for again priming relay LT over a circuit extending from (+), break contact of relay XC1, make contact of relay XC2, conductor 14, winding of relay LT, conductor 13 and break contact of relay XC1 to (−). Relay LT operates and when relay XC2 is released by the next release of relay ST, a test for a (+) or ground condition on the called line is made, this test circuit being traced from (−), break contact of relay XC1, conductor 13, winding of relay LT, conductor 14, resistor VR, make contact of relay XC3 (operated when relay XC2 was operated), conductor TT, wiper T, called line circuit, wiper R, conductor TR and make contact of relay XC3 to conductor TT. Assuming no ground is found on the called line, relay LT will release for permitting relay ST to again operate and again operate relay XC1.

A priming circuit is again closed for relay LT now extending from (+), make contact of relay XC1, conductor 13, winding of relay LT, conductor 14, break contact of relay XC2 and make contact of relay XC1 to (−). This operates relay LT and when relay ST is next released, relay XC1 is locked, relay XC2 is operated, relay XC3 is released and relay XC4 is locked operated (it being operated when relay XC2 released after the operation of relay XC3). A test for a closed loop or short circuit condition is now made of the called line over a circuit which may be traced from (+), make contact of relay XC1, conductor 13, winding of relay LT, conductor 14, resistor VR, make contact of relay XC2, break contact of relay XC3, conductor TT, wiper T, tip side of the called line, ring side of the called line, wiper R, conductor TR, break contact of relay XC3, make contact of relay XC2, make contact of relay XC4 and resistor RS to (−). Assuming no loop fault on the called line, relay LT will release.

When relay ST is next operated for releasing relay XC1 and for locking relay XC2, as previously described, relay LT is again energized over a circuit extending from (+), break contact of relay XC1, make contact of relay XC2, conductor 14, winding of relay LT, conductor 13 and break contact of relay XC1 to (−). This operates relay LT but at this time this operation is of no purpose. When relay XC3 was released, with relay XC4 operated, conductor 20 was disconnected from the master ground conductor so that the next operation of relay ST is ineffective to energize relay TE, with the result that this relay is released. The release of relay TE opens up conductor PL for effecting the release of the counting relays of the second group which were left operated (XC2 and XC4), thus placing the second group of counting relays in their normal condition for releasing relay LT.

The circuits are now in condition awaiting release of the connection or the dialing of another digit for causing circuit operations, as will be later described. It will be noted that relays CB, RD, HS, CBP and SF are operated and all other relays are released, thus placing the circuits in the same condition as they were before the digit 1 was dialed for stepping the connector one step in its secondary direction. It will also be noted that the distant operator can listen in on the called line at this time because the talking circuit, including the talking condensers and conductors 11 and 12, is extended to the called line by way of break contacts of relays TT, XD, C3, XC1, XC2, XC3 and wipers T and R of the test connector.

*Repeating automatic test*

It will now be assumed that the distant operator wishes to have the automatic test of the called line repeated. To accomplish this, digit 2 is dialed for leaving the test connector in connection with the same line and for repeating the above described automatic testing operations. The first release of relay CB effects the release of relay CBP, the operation and locking of relay YD in the previously described manner. The energization of relay CB at the end of this first impulse energizes relay CBP for operating and locking relay C1 in the above described manner. The release of relay CB at the beginning of the second impulse releases relay CBP for closing the second locking circuit for relay C1, for operating and locking relay C2 and for operating relay C3 in the previously described manner. The operation of relay C3 again closes the circuit for operating relay TE. The operation of relay C3 opens up the above described listening circuit to the called line. The operation of relay CB at the end of the second impulse releases relay YD (because relay CB remains operated at this time), operates relay CBP for releasing relay C1 and for locking relay C2. When relay YD is released, conductor 40 is de-energized for effecting the release of relays C2 and C3. With relay TE now energized, the previously described circuit for operating relay ST is again completed and extends from common interrupter INT, break contact of relay C4, conductor 19, break contact of relay TT, break contact of relay LT, make contact of relay SF, break contact of relay YD, conductor 38, break contacts in series of relays C3—C1, make contact of relay TE, conductor 51, break contact of relay BY and upper winding of relay ST to (−). The second group of counting relays now runs through the cycle as previously described for again priming the LT relay and for making the three tests of the called line. After this cycle is completed the circuits are again restored to the same condition above mentioned, that is, relays CB, RD, HS, CBP and SF operated, with all other relays of the circuit released, thus placing the circuit in awaiting condition for another dialing operation from the distant station.

During the testing operation above described the circuits are so arranged that this testing operation will not be interfered with, nor will any of the relays (except relay CB) be affected in the event that the distant station should turn the dial while this automatic testing operation is going on. The circuit for accomplishing this result may be traced from (+) on the master ground conductor, make contacts in multiple of relays XC4, XC3 and XC1 (at least one of which relays will be operated during the automatic testing operation, conductor 63 and upper winding of relay CBP to (−). This holds relay CBP in its operated position so that interruptions of relay CB in response to the turning of the dial at the calling station will not interrupt the circuit of the winding of relay CBP, consequently only the CB relay will be operated. It will be noted that, at this time, the interrupted circuit through break contact of relay CB, make contact of relay RD, break contact of relay XD, make contact of relay HS to the winding of relay YD is open at a break contact of relay CBP, thus preventing the energization of relay YD.

*Testing from distant office*

It will now be assumed that the test operator at the distant office desires to set up the circuits so that a test can be made on the called line by way of the test conductors TPT and TPR. In order to do this the operator will dial 3. The first release of relay CB opens up and releases relay CBP for again operating and locking relay YD. When relay CB operates to mark the end of this impulse, relay CBP is operated for operating and locking relay C1. When relay CB releases to mark the beginning of the second impulse, relay CBP is released for closing the second locking circuit for relay C1, for operating and locking relay C2 by way of its first locking circuit and for operating relay C3, all in the previously described manner.

When relay CB operates to mark the end of the second impulse, relay CBP is again operated for releasing relay C1 and for locking relay C2 by way of its second locking circuit. When relay CB releases to mark the beginning of the third impulse, relay CBP is released for releasing relay C2 and for operating and locking relay C4. When relay CB operates to mark the end of the third impulse, relay CBP is operated for again operating relay C1, all in the previously described manner. Since this is the end of the transmission of the three impulses, relay YD will release due to the fact that relay CB remains operated.

Since relay C1 is operated, relay C2 is released and relays C3 and C4 are operated, when relay YD releases, a circuit is closed for operating test relay TT extending from (+), make contact of relay SF, break contact of relay YD, conductor 36, make contact of relay C4, conductor 69, make contact of relay C1, break contact of relay C2, and winding of relay TT to (−). The operation of relay TT closes a locking circuit for itself extending from (+) on conductor 36, make contact and winding of relay TT to (−). The operation of relay TT disconnects the master ground conductor from the conductor leading through the make contact of relay C1 to conductor 40 for effecting the release of the first group of counting relays left operated at this time, relays C1, C3 and C4. When relay C3 was operated during the transmission of the impulses for this digit, relay TE was operated over the previously described circuit including conductor 21. Now when relay C3 is released, this circuit is opened for effecting the release of relay TE.

The called line can now be tested over a clean circuit extending to this line and traced from the test operator's position by way of conductors TPT and TPR, make contacts of relay TT, conductors 61 and 62, break contacts of relay XD, conductors 11 and 12, break contacts of relay C3, break contacts of relays XC1, XC2 and XC3 to the called line by way of wipers T and R of the test connector. When the test clerk completes the test of the called line the connection may either be released or another digit may be dialed for effecting other operations of the circuit. If some other digit is dialed the release of relays CB and CBP at the beginning of this digit close a circuit for operating relay YD extending from (+), break contact of relay CB, make contact of relay RD, break contact of relay XD, conductor 53, make contact of relay HS, break contact of relay CBP, and winding of relay YD to (−). Relay YD again closes the above described locking circuit for itself for keeping this relay operated until the end of the digit. This operation of relay YD opens up the above described locking circuit for relay TT for effecting the release of this relay, thus placing the circuits in condition for the next digit.

*Release of test connector*

It will now be assumed that the distant operator desires to release the test connector without releasing the test selector so that other tens and units digits may be dialed for selecting a line in another level. In order to accomplish this the digit 4 is dialed. Relay CB responds to the four impulses of this digit and causes relay CBP to repeat these impulses in the previously described manner. When relay CBP releases in response to the first release of relay CB at the beginning of the first impulse, relay YD is operated and locked in the previously described manner. It will be pointed out at this time that relay CBP repeats the impulses of the digit when number 2, 3 or 4 is dialed, while this relay repeats the groups of impulses or digits when the tens, units or station digits are dialed, all in the previously described manner. When relay CBP operates at the end of the first impulse, relay C1 is operated and its first locking circuit is closed. When relay CBP releases to mark the beginning of the second impulse, relay C1 is locked by way of its second locking circuit, relay C2 is operated and locked and relay C3 is operated. When relay CBP operates at the end of the second impulse, relay C1 is released by opening its second locking circuit, after which the first locking circuit of relay C2 is opened. When relay CBP releases to mark the beginning of the third impulse, the second locking circuit of relay C2 is opened for releasing relay C2, which in turn closes a locking circuit for relay C3 and an operating circuit for relay C4, the latter relay closing a locking circuit for itself. When relay CB operates at the end of the third impulse, relay C1 is operated and locked and when relay CB releases at the beginning of the fourth impulse, the second locking circuit for relay C1 is closed, relay C2 is operated and locked and relay C3 is released, all in the previously described manner.

When relay CB energizes to mark the end of the fourth impulse, relay YD is released because it has time to lose its slow acting characteristics at this time. This operation of relay CB again operates relay CBP for releasing relay C1 and for locking relay C2 by way of its second locking circuit. A circuit is now closed for operating relay XD which may be traced from (+), make contact of relay RD, conductor 39, make contact of relay C4, conductor 64, make contact of relay C2, break contact of relay C1, make contact of relay TE (operated as will next be described) conductor 52 and upper winding of relay XD to (−). Relay XD closes a locking circuit for itself extending from (+), make contact of relay RD, make contact of relay XD, conductor 35, make contact of relay TE, conductor 52 and upper winding of relay XD to (−).

Referring back to the point in the cycle where relay C3 was operated, a circuit is closed for operating relay TE extending from (+) on the master ground conductor, make contact of relay C3, conductor 21 and winding of relay TE to (−). The operation of relay XD, as above described, opens up the above described circuit for relay TE by disconnecting (+) from the master ground conductor for effecting the slow release of relay TE. Furthermore, this disconnection of (+) from the master ground conductor by the operation of relay XD also effects the release of relays CBP, C2, C4 and SF, since these relays were held up from this (+). Since relay XD is locked to direct (+) at the uppermost make contact of relay RD through a make contact of relay TE, relay XD will not release until after relay TE is released. This provides the time required for opening up the control conductor leading to the test connector for releasing this connector. This control circuit may now be traced from wiper MW, make contact of relay HS to a break contact of relay TT, this contact being open because relay TT is now operated as long as relay XD remains operated. This operating circuit for relay TT may be traced from (+), make contact of relay RD, make contact of relay XD and winding of relay TT to (−). When relay XD releases, this circuit is opened for effecting the release of relay TT for again closing up the control conductor. This provides sufficient time to release the test connector because the control conductor is opened during the drop away time of two slow acting relays. This operation of relay TT also opens up the conductors leading to the T, R and S wipers of the test connector to keep these wipers open during the release operation of this switch. The circuits are now in condition for the test operator to again dial the tens, units and station digits in the previously described manner.

*Release operation*

When the test operator is through with the test selector, the connection is released by opening up the incoming line circuit for releasing relays CB and RD in sequence. The release of relay RD opens up the locking circuit for relay HS for releasing this relay. The release magnet is energized over a circuit extending from (+) on the common alarm conductor RA, break contact of relay RD, off normal contact ON and winding of magnet MZ to (—). When the switch reaches normal, the off normal contact opens up this circuit for deenergizing magnet MZ. The release of relay CB again closes the previously described circuit for operating and locking relay YD, this relay releasing when relay RD is released. The operation of relay YD again closes the circuit for operating relay CBP, which in turn operates and locks relay C1, these two relays being released when relay RD is released. This operation of relays YD, CBP and C1 during the release of the test selector have no function. The release of relay CB opens up the control conductor to the CB relay of the test connector for effecting the release of this switch. This places all circuits in their normal condition in readiness for the start of another dialing operation beginning with the hundreds digit for operating the switch associated with the test selector.

*Test jack operation*

The monitor and test jack shown in the left hand portion of Fig. 1 is provided so that the attendant at the community dial office, in which the test selector is located, can plug in with a test hand telephone and cause the circuits to go through the previously described operations in the same manner as when dialed from a distant test position. It is necessary to operate the discriminating relay HS when plugging into the test jack, since this relay is not operated if a local subscriber in the community dial office dials the number to select the test selector. The reason that relay HS is not operated from a local call is that there is no (—) on the discriminating conductor HS from a local line. When the test set is plugged into the test jack a circuit is closed for operating relay CB which may be traced from (—), lower winding of relay CB, break contacts in series of relays ST and BY, ring side of the test jack, through the dial impulse springs of the test set, tip side of the test jack, conductor 57, break contact of relay HS and break contact of relay TT to (+). This operates relays CB, RD and XD in the previously described manner. A circuit is now closed for operating relay TT extending from (+), make contact of relay RD, make contact of relay XD, conductor 35 and winding of relay TT to (—). The operation of relay TT substitutes the lower winding of relay HS for the direct connection to (+) included in the above described circuit including the test set. This operates and locks relay HS, this relay transferring the HS conductor from the lower winding of relay HS to resistor 1RS, in the above described manner, this transfer being of no effect at this time. At the lowermost make contact of the make-before-break combination of relay HS, the tip terminal of the test jack is transferred from the lower winding of relay HS to the tip conductor extending through the upper winding of relay CB, thus placing the circuits in condition for dialing and operating in the above described manner.

When the test selector is operated from the test jack, the flashing operation of relay ST, during the automatic testing of the called line, will flash lamp SIG as a visual indication to the tester.

What is claimed is:

1. In combination, a remotely controlled test selector, a telephone line, means for operating said selector to connect with said line, means in said selector for short circuiting said line, and means in said selector for making a test of said short-circuited line.

2. In combination, a test selector, a telephone line comprising a pair of line conductors, remote control means for operating said selector to connect with said line, means in said selector for short-circuiting said line, and means in said selector for automatically testing said short-circuited line for a ground on either of said conductors.

3. In combination, a test selector, a telephone line, remote control means for operating said selector to connect with said line, means in said selector for short-circuiting said line, means in said selector for automatically making a test of said short-circuited line, and means responsive to said test for transmitting a distinctive signal indicative of the condition of said line.

4. In combination, a test selector, a telephone line comprising a pair of line conductors, means for operating said selector to connect with said line, means in said selector for short-circuiting said line, and means in said selector for automatically making a test of said short-circuited line for a battery connection on either of said conductors.

5. In combination, a test selector, a source of current, a telephone line, an operator's position connected to said selector by a two wire trunk circuit, means controlled from said position over said trunk circuit for operating said selector to connect with said line, means in said selector for applying said source of current to said line, means including said selector for automatically testing said line from said source of current, and means responsive to said test for transmitting a distinctive signal over said trunk circuit to said operator's position indicative of a faulty or non-faulty condition of said line.

6. In combination, a test selector, a source of current, a telephone line, an operator's position connected to said selector by a two wire trunk circuit, means controlled from said position over said trunk circuit for operating said selector to connect with said line, means including a relay in said selector for periodically applying said source of current to said line, means determined by the faulty or non-faulty condition of said line during said test for variably controlling the operation of said relay, and means responsive to the variable operation of said relay for transmitting a distinctive signal over said trunk circuit to said operator's position indicative of the faulty or non-faulty condition of said line.

7. In a test selector, two signalling relays operatively associated with said selector, an operator's position, a line, terminals connected to said line, means including said test selector for extending a connection from said operator's position to said terminals, means responsive to the extension of a connection to said terminals when the line is busy for operating one of said relays, means responsive to the extension of a connection to said terminals when the line is idle for automatically testing said line for a faulty or a non-faulty condition, means responsive to said automatic test of said line for operating said second relay, and means controlled by the operation of either of said relays for transmitting a distinctive signal to said operator's position.

8. In a test selector, two signalling relays, means for operatively associating said relays with said selector, an operator's position, a line, terminals connected to said line, means including said test selector for extending a connection from said operator's position to said terminals, means responsive to the extension of a connection to said terminals when the line is busy for operating one of said relays, means responsive to the extension of a connection to said terminals when the line is idle for automatically testing said line for a faulty or a non-faulty condition, means responsive to said automatic test of said line for operating said second relay, and means controlled by the operation of either of said relays for transmitting a distinctive signal to said operator's position to indicate the busy or faulty or non-faulty condition of said line.

9. In a test selector, two signalling relays, means for operatively associating said relays with said selector, an operator's position, a line, terminals connected to said line, means including said test selector for extending a connection from said operator's position to said terminals, means responsive to the extension of a connection to said terminals when the line is busy for operating one of said relays, means responsive to the extension of a connection to said terminals when the line is idle for automatically testing said line for a faulty or non-faulty condition, means responsive to said automatic test of said line for intermittenly operating said second relay, means controlled by the operation of either of said relays for transmitting a distinctive signal to said operator's position to indicate the busy or faulty or non-faulty condition of said line, and means for controlling the number of intermittent operations of said second relay whereby the number of signals transmitted to said position indicates the faulty or non-faulty condition and the type of fault found on said line.

10. In a testing system for telephone lines, a test selector, an incoming trunk to said test selector, a telephone line, means controlled over said incoming trunk for extending a connection by way of said test selector to said line, a polar relay, means for including said polar relay in said incoming trunk, means controlled by a clear or faulty condition of said line for intermittently reversing the battery back over said incoming trunk a number of times determined by the condition of said line, means controlled by said battery reversal for operating said polar relay, and means controlled by said polar relay for operating a signal a number of times indicative of the condition of said line.

11. In a test selector, a trunk circuit, a discriminating relay, a test operator's position, a discriminating conductor, means for associating said discriminating conductor with said trunk circuit for operating said discriminating relay when the test selector is seized from said test operator's position, a line relay, means including the line conductors associated with said trunk circuit for operating said line relay when the test selector is seized, means controlled by said line relay for operating the test selector through a cycle of operations only when said discriminating relay is operated, a test jack associated with said selector, and means for controlling said discriminating relay and said line relay over said line conductors whereby said test selector can be operated through said cycle from said test jack.

12. In a telephone system, a test operator's position, a test selector accessible to said test position, a plurality of test connectors accessible to said test selector, a plurality of groups of lines respectively accessible to said test connectors, a pair of trunk conductors, means for transmitting digits from said test position over said trunk conductors to said test selector, means included in said test selector and responsive to a first digit transmitted over said trunk conductors for operating said test selector to select one of said test connectors, means included in said test selector and responsive to second and third digits transmitted over said trunk conductors for operating said one test connector to select one of the lines accessible thereto, a step by step device operatively associated with said test selector, means at said operator's position for controlling the step by step operation of said device, and means including said step by step device and responsive to a fourth digit transmitted over said trunk conductors for automatically testing said one line for a fault thereon.

13. In a telephone system, a test operator's position, a test selector accessible to said test position, a plurality of test connectors accessible to said test selector, a plurality of groups of lines respectively accessible to said test connectors, a pair of trunk conductors, means for transmitting digits from said test position over said trunk conductors to said test selector, means included in said test selector and responsive to a first digit transmitted over said trunk conductors for operating said test selector to select one of said test connectors, means included in said test selector and responsive to second and third digits transmitted over said trunk conductors for repeating impulses corresponding to said second and third digits from said test selector to said one test connector for operating said one test connector to select one of the lines accessible thereto, a step by step device operatively associated with said test selector, means at said operator's position for controlling the step by step operation of said device, and means including said step by step device and responsive to a fourth digit transmitted over said trunk conductors for automatically testing said one line for a fault thereon.

14. In a telephone system, a test operator's position, a test selector accessible to said test position, a plurality of test connectors accessible to said test selector, a plurality of groups of lines respectively accessible to said test connectors, a pair of trunk conductors, means for transmitting digits from said test position over said trunk conductors to said test selector, means included in said test selector and responsive to a first digit transmitted over said trunk conductors for operating said test selector to select one of said test connectors, means included in said test selector and responsive to second and third digits transmitted over said trunk conductors for operating said one test connector to select one of the lines accessible thereto, a step by step device operatively associated with said test selector, means at said operator's position for controlling the step by step operation of said device, and means including said step by step device and responsive to a fourth digit transmitted over said trunk conductors for automatically testing said one line for different types of faults thereon.

15. In a telephone system, a test operator's position, a test selector accessible to said test position, a plurality of test connectors accessible to said test selector, a plurality of groups of lines respectively accessible to said test connectors, a pair of trunk conductors, means for transmitting digits from said test position over said trunk conductors to said test selector, means included in said test selector and responsive to a first digit transmitted over said trunk conductors for operating said test selector to select one of said test connectors, means included in said test selector and responsive to second and third digits transmitted over said trunk conductors for operating said one test connector to select one of the lines accessible thereto, means included in said test selector and responsive to a fourth digit transmitted over said trunk conductors for automatically testing said one line for different types of faults thereon, and means including said last-mentioned means for transmitting signals back over said trunk conductors indicative of the faulty or non-faulty condition and the type of fault found on said one line.

16. In a telephone system, a test operator's position, a test selector accessible to said test position, a plurality of test connectors accessible to said test selector, a plurality of groups of lines respectively accessible to said test connectors, a pair of trunk conductors, means for transmitting digits from said test position over said trunk conductors to said test selector, means included in said test selector and responsive to a first digit transmitted over said trunk conductors for operating said test selector to select one of said test connectors, means included in said test selector and responsive to second and third digits transmitted over said trunk conductors for operating said one test connector to select one of the lines accessible thereto, means included in said test selector and responsive to a fourth digit transmitted over said trunk conductors for automatically testing said one line for different types of faults thereon, means including said last-mentioned means for transmitting signals back over said trunk conductors indicative of the faulty or non-faulty condition and the type of fault found on said one line, and means included in said test selector and responsive to a fifth digit transmitted over said trunk conductors for repeating said automatic test.

17. In a telephone system including a test position; subscriber lines; means controllable from said test position for setting up a test connection therefrom to any one of said subscriber lines; instrumentalities selectively controllable from said test position for performing various manual tests via said test connection upon said one subscriber line; automatic testing apparatus and additional means controllable from said test position for connecting said apparatus to said one subscriber line, said apparatus comprising cyclic mechanism operative sequentially through a plurality of positions; means controllable from said test position for initiating operation of said cyclic mechanism; a test device; means responsive to operation of said cyclic mechanism into its different positions for setting up corresponding different test circuits including said test device via said test connection to said one subscriber line, said different test circuits corresponding to different types of faults upon said one subscriber line, whereby a distinctive response of said test device when said cyclic mechanism occupies a given one of its positions is indicative of the corresponding type of fault upon said one subscriber line; means responsive to said distinctive response of said test device for arresting operation of said cyclic mechanism, and means governed by the arrested position of said cyclic mechanism for controlling the return of a corresponding signal to said test board indicative of the type of fault upon said one subscriber line.

18. In a testing system for telephone lines; an impulse transmitter; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device for extending a connection to one of said lines; means responsive to said digits for operating said first series of counting relays for counting the number of said digits; means responsive to a particular number of digits counted by said first series of counting relays for causing said second series of counting relays to operate step by step through an operating cycle; and means for automatically making a test of said one line for a faulty or a non-faulty condition during said operating cycle.

19. In a testing system for telephone lines; an impulse transmitter; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device for extending a connection to one of said lines; means responsive to said digits for operating said first series of counting relays for counting the number of said digits; means responsive to a particular one of said digits counted by said first series of counting relays for causing said second series of counting relays to operate through an operating cycle; and means including contacts of said second series of counting relays for automatically making a test of said one line for a faulty or a non-faulty condition.

20. In a testing system for telephone lines; an impulse transmitter; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device for extending a connection to one of said lines; means responsive to said digits for operating said first series of counting relays for counting the number of said digits; means responsive to a particular number of digits counted by said first series of counting relays for causing said second series of counting relays to operate step by step through an operating cycle; means for automatically making a test of said one line for a faulty or a non-faulty condition during said operating cycle; and means including said first series of counting relays and responsive to an additional digit for causing said second series of counting relays to operate through another cycle and to repeat said test.

21. In a testing system for telephone lines; an impulse transmitter; a test connector; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device and said test connector for extending a connection to one of said lines; means responsive to said digits for operating said first series of counting relays for counting the number of said digits; means responsive to a particular number of digits counted by said first series of counting relays for causing said second series of counting relays to operate step by step through an operating cycle; means for automatically making a test of said one line for a faulty or non-faulty condition during said operating cycle; and means including said first series of counting relays and responsive to an additional digit for releasing said test connector.

22. In a testing system for telephone lines; an impulse transmitter; a test connector; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device and said test connector for extending a connection to one of said lines; means responsive to said digits for operating said first series of counting relays for counting the number of said digits; means responsive to a particular number of digits counted by said first series of counting relays for causing said second series of counting relays to operate step by step through an operating cycle; means for automatically making a test of said one line for a faulty or non-faulty condition during said operating cycle; and means including said first series of counting relays and responsive to an additional digit for advancing said test connector to another one of said lines.

23. In a testing system for telephone lines; an impulse transmitter; a test connector; a test selector, said test selector comprising a selecting device and a series of counting relays; a control conductor extending from said test selector to said test connector; means including said impulse transmitter for transmitting a plurality of digits to said test selector; means responsive to said digits and including said selecting device for impulsing said control conductor for extending a connection from said test selector by way of said test connector to one of said lines; means responsive to said digits for operating said series of counting relays a first time for counting the number of said digits; means including said impulse transmitter for transmitting an additional digit to said test selector; means responsive to the number of impulses in said additional digit for operating said series of counting relays a second time; and means controlled in accordance with the number of impulses counted said second time for releasing said test connector or advancing it to another of said lines.

24. In a testing system for telephone lines; an impulse transmitter; a test connector; a test selector, said test selector comprising a selecting device and a series of counting relays; a control conductor extending from said test selector to said test connector; means including said impulse transmitter for transmitting a plurality of digits to said test selector; means responsive to said digits and including said selecting device for impulsing said control conductor for extending a connection from said test selector by way of said test connector to one of said lines; means responsive to said digits for operating said series of counting relays a first time for counting the number of said digits; means including said impulse transmitter for transmitting an additional digit to said test selector; means responsive to the number of impulses in said additional digit for operating said series of counting relays a second time; and means controlled in accordance with the number of impulses counted said second time for releasing said test connector or advancing it to another of said lines, said releasing and advancing operations being delayed for a predetermined time interval after the transmission of the impulses in said additional digit.

25. In a testing system for telephone lines; an impulse transmitter; a test connector; a test selector, said test selector comprising a selecting device, a first series of counting relays and a second series of counting relays; means including said impulse transmitter for transmitting a plurality of digits to said test selector, each digit comprising one or more impulses; means responsive to said digits and including said selecting device and said test connector for extending a connection to one of said lines; means responsive to said digits for operating said first series of counting relays for counting the number of said digits; means responsive to a particular number of digits counted by said first series of counting relays for causing said second series of counting relays to operate step by step through an operating cycle; means for automatically making a test of said one line for a faulty or non-faulty condition during said operating cycle; and means including said first series of counting relays and responsive to an additional digit for advancing said test connector to another one of said lines and for causing said second series of counting relays to operate through another cycle and to repeat said test.

26. In a test selector, means for transmitting a plurality of series of impulses to said test selector, means responsive to a first plurality of said series of impulses for extending a connection to a circuit to be tested, a first and a second plurality of counting relays, means including said first plurality of counting relays for counting said series of impulses, means responsive to the counting of said first plurality of said series of impulses for causing said second plurality of counting relays to step through a plurality of testing positions, means for automatically testing said circuit during the stepping of said second plurality of counting relays, repeating means including said first series of counting relays for counting the number of impulses in an additional series of said plurality, and means controlled by said repeating means for causing said second plurality of counting relays to repeat the automatic testing of said circuit.

27. In a testing system for telephone lines, a test operator's position, a test selector accessible to said test position, a line accessible to said test selector, a pair of control conductors and a pair of test conductors extending from said test position to said test selector, means for transmitting digits from said test position over said control conductors to said test selector, means responsive to a plurality of digits transmitted over said control conductors for extending a connection from said test selector to said line, means responsive to a first particular digit transmitted over said control conductors following said plurality of digits for testing said line from said test selector, and means responsive to a second particular digit transmitted over said control conductors following said plurality of digits for connecting said line to said test conductors whereby said line may be tested from said test position.

28. In a testing system for telephone lines, a test operator's position, a test selector, means rendering said test selector accessible to said test position, a line, means rendering said line accessible to said test selector, a pair of control conductors and a pair of test conductors extending from said test position to said test selector, means for transmitting digits from said test position over said control conductors to said test selector, means responsive to a plurality of digits transmitted over said control conductors for extending a connection from said test selector to said line, means responsive to a first particular digit transmitted over said control conductors following said plurality of digits for testing said line from said test selector and for sending a signal back over said control conductors to said test position indicative of the condition of said line, and means responsive to a second particular digit transmitted over said control conductors following said plurality of digits for connecting said line to said test conductors whereby said line may be tested from said test position.

29. In a selector for telephone systems, a step by step device, means for operatively associating said device with said selector, a group of counting relays, means for operatively associating said counting relays with said selector, an impulse relay and an impulse repeating relay operatively associated with said selector, means for operating said impulse relay by a plurality of series of impulses, means controlled by said impulse relay for operating said device in accordance with a first one of said series of impulses, means controlled by said impulse relay for operating said repeating relay in accordance with a plurality of said series of impulses, means controlled by said repeating relay for causing said group of counting relays to count off the number of series of impulses in said plurality, and additional means controlled by said repeating relay for causing said group of counting relays to count off the number of impulses in a second one of said series.

30. In a selector for telephone systems, a step by step device, means for operatively associating said device with said selector, a group of counting relays, means for operatively associating said counting relays with said selector, an impulse relay and an impulse repeating relay, means for operatively associating said impulse relay and said impulse repeating relay with said selector, means for operating said impulse relay by a plurality of series of impulses, means controlled by said impulse relay for operating said device in accordance with a first one of said series of impulses, means controlled by said impulse relay for operating said impulse repeating relay in accordance with a plurality of said series of impulses, means controlled by said repeating relay for causing said group of counting relays to operate and re-operate to count off the number of series of impulses in said plurality, and additional means controlled by said repeating relay for causing said group of counting relays to operate and re-operate to count off the number of impulses in a second one of said series.

31. In a selector for telephone systems, a connector, means rendering said connector accessible to said selector, a step by step device, means for operatively associating said device with said selector, a group of counting relays, means for operatively associating said counting relays with said selector, an impulse relay and an impulse repeating relay, means for operatively associating said impulse relay and said impulse repeating relay with said selector, means for operating said impulse relay by a plurality of series of impulses, means controlled by said impulse relay for operating said device in accordance with a first one of said series of impulses for selecting said connector, means controlled by said impulse relay for operating said repeating relay in accordance with a plurality of said series of impulses for operating said connector, means controlled by said repeating relay for causing said group of counting relays to count off the number of series of impulses in said plurality, additional means controlled by said repeating relay for causing said group of counting relays to count off the number of impulses in a second one of said series, and means controlled by said additional means for operating or releasing said connector as determined by the number of impulses in said second series.

32. In a testing system for telephone lines, a test operator's position, a directively controlled automatic switch, a test circuit extending from said position to said switch, a line circuit extending from said position to said switch, means controlled from said position over said line circuit and including said switch for extending said test circuit to a called line, a step by step device operatively associated with said automatic switch, means at said test operator's position for controlling the step by step operation of said device, and means responsive to a particular digit transmitted from said position to said switch to control said device for switching said called line from said test circuit to said line circuit whereby the operator at said position can listen in on said called line by way of said line circuit.

FRANK KESSLER.
WINFRED T. POWELL.

REFERENCES CITED

The following references are of record in the file of this patent:

UNITED STATES PATENTS

| Number | Name | Date |
|---|---|---|
| 1,253,228 | Goodrum | Jan. 15, 1918 |
| 1,340,935 | Clausen | May 25, 1920 |
| 1,531,046 | Temple | Mar. 24, 1925 |
| 1,576,723 | Crocker | Mar. 16, 1926 |
| 1,716,471 | Tharp | June 11, 1929 |
| 1,881,544 | Hartley | Oct. 11, 1932 |
| 2,091,116 | Griffins | Aug. 24, 1937 |
| 2,234,272 | Morrow | Mar. 11, 1941 |
| 2,389,076 | Perry | Nov. 13, 1945 |
| 2,550,820 | Kessler | May 1, 1951 |